US011231489B2

(12) United States Patent
Viswanatha et al.

(10) Patent No.: US 11,231,489 B2
(45) Date of Patent: Jan. 25, 2022

(54) SELECTIVE SUBBAND PROCESSING FOR A LIDAR SYSTEM

(71) Applicant: Aeva, Inc., Mountain View, CA (US)

(72) Inventors: Kumar Bhargav Viswanatha, Santa Clara, CA (US); Rajendra Tushar Moorti, Mountain View, CA (US); Jose Krause Perin, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 153 days.

(21) Appl. No.: 16/705,052

(22) Filed: Dec. 5, 2019

(65) Prior Publication Data

US 2021/0173058 A1 Jun. 10, 2021

(51) Int. Cl.
*G01S 7/4915* (2020.01)
*G01S 17/34* (2020.01)
(Continued)

(52) U.S. Cl.
CPC ............ *G01S 7/4915* (2013.01); *G01S 17/34* (2020.01); *G01S 7/484* (2013.01); *G01S 7/487* (2013.01);
(Continued)

(58) Field of Classification Search
None
See application file for complete search history.

(56) References Cited

U.S. PATENT DOCUMENTS

| 5,822,097 | A | * | 10/1998 | Tournois | ............ G02B 27/4233 |
| | | | | | 385/37 |
| 7,023,545 | B2 | * | 4/2006 | Slater | ........................ G01J 3/42 |
| | | | | | 356/326 |

(Continued)

FOREIGN PATENT DOCUMENTS

| WO | WO-2018230474 A1 | * | 12/2018 | ............... G01C 3/06 |
| WO | 2019070751 A1 | | 4/2019 | |
| WO | WO-2020032507 A1 | * | 2/2020 | ............ H04W 74/08 |

OTHER PUBLICATIONS

Kim, Sangdong; Kim Bong-Seok; Jin, Youngseok; and Lee Jonghun—"Extrapolation—RELAX Estimator Based on Spectrum Partitioning for DOA Estimation of FMCW Radar"; Advanced Radar Technology (ART) Laboratory, Convergence Research Center for Future Automotive Technology; Jul. 24, 2019 (Year: 2019).*

(Continued)

*Primary Examiner* — Eman A Alkafawi
*Assistant Examiner* — Leonard S Liang
(74) *Attorney, Agent, or Firm* — Womble Bond Dickinson (US) LLP

(57) ABSTRACT

A signal processing system includes a time domain processing module to receive samples of a range-dependent time domain baseband signal in a frequency modulated continuous wave (FMCW) LIDAR system, and to generate and select time domain subband signals based on time domain subband selection criteria, a time domain to frequency domain converter coupled with the time domain processing module, to generate range-dependent frequency outputs
(Continued)

from the selected time domain subbands, and a frequency domain processing module coupled with the time domain to frequency domain converter, to generate and select frequency domain subbands based on frequency domain subband collection criteria, and to detect energy peaks corresponding to target ranges in the field of view of the LIDAR system.

14 Claims, 11 Drawing Sheets

(51) Int. Cl.
| | | |
|---|---|---|
| G01S 17/89 | (2020.01) | |
| G01S 7/487 | (2006.01) | |
| G01S 7/481 | (2006.01) | |
| G01S 17/931 | (2020.01) | |
| G01S 17/88 | (2006.01) | |
| G01S 17/26 | (2020.01) | |
| G01S 17/58 | (2006.01) | |
| G01S 7/4865 | (2020.01) | |
| G01S 7/484 | (2006.01) | |

(52) U.S. Cl.
CPC ........... *G01S 7/4817* (2013.01); *G01S 7/4865* (2013.01); *G01S 17/26* (2020.01); *G01S 17/58* (2013.01); *G01S 17/88* (2013.01); *G01S 17/89* (2013.01); *G01S 17/931* (2020.01)

(56) References Cited

U.S. PATENT DOCUMENTS

| | | | | |
|---|---|---|---|---|
| 10,528,054 | B2* | 1/2020 | Zou | G05D 1/0231 |
| 2005/0207943 | A1* | 9/2005 | Puzey | C12Q 1/04 |
| | | | | 422/82.05 |
| 2007/0211786 | A1* | 9/2007 | Shattil | H04B 1/707 |
| | | | | 375/141 |
| 2009/0110033 | A1* | 4/2009 | Shattil | H04J 14/0298 |
| | | | | 375/141 |
| 2012/0194823 | A1* | 8/2012 | Moore | G01B 9/02004 |
| | | | | 356/479 |
| 2014/0334830 | A1* | 11/2014 | Pierrottet | G01S 7/4911 |
| | | | | 398/187 |
| 2015/0177367 | A1* | 6/2015 | Sebastian | G01S 7/493 |
| | | | | 356/5.09 |
| 2015/0378187 | A1* | 12/2015 | Heck | G01S 17/42 |
| | | | | 250/227.21 |
| 2016/0352543 | A1* | 12/2016 | Hu | H04L 27/26414 |
| 2017/0176575 | A1* | 6/2017 | Smits | G01S 17/10 |
| 2018/0323657 | A1* | 11/2018 | Hannigan | H02J 50/23 |
| 2019/0056476 | A1* | 2/2019 | Lin | G01S 7/032 |
| 2019/0195985 | A1* | 6/2019 | Lin | G01S 7/023 |
| 2019/0222985 | A1* | 7/2019 | Nguyen | H04B 7/00 |
| 2019/0289420 | A1* | 9/2019 | Makinen | H04S 7/304 |
| 2019/0310372 | A1* | 10/2019 | Crouch | G01S 7/491 |
| 2019/0361440 | A1* | 11/2019 | Wu | G05D 1/0276 |
| 2019/0378280 | A1* | 12/2019 | Cho | G06T 7/70 |
| 2019/0378476 | A1* | 12/2019 | Jeon | G06F 3/147 |
| 2019/0383913 | A1* | 12/2019 | Crouch | G01S 7/497 |
| 2019/0384379 | A1* | 12/2019 | Huh | G06F 3/011 |
| 2019/0384380 | A1* | 12/2019 | Woo | G06K 9/00335 |
| 2019/0384383 | A1* | 12/2019 | Lee | G06K 9/00671 |
| 2019/0384389 | A1* | 12/2019 | Kim | G06K 9/00355 |
| 2019/0384414 | A1* | 12/2019 | Woo | G09G 5/373 |
| 2019/0384484 | A1* | 12/2019 | Lee | G06F 3/0346 |
| 2019/0384976 | A1* | 12/2019 | Lee | H04W 4/48 |
| 2019/0384977 | A1* | 12/2019 | Woo | G06K 9/4671 |
| 2019/0385375 | A1* | 12/2019 | Park | G06F 1/1616 |
| 2019/0385380 | A1* | 12/2019 | Yoon | G06T 19/006 |
| 2019/0392647 | A1* | 12/2019 | Lee | G06F 3/013 |
| 2020/0013215 | A1* | 1/2020 | Vosoughi | G06K 9/6211 |
| 2020/0021913 | A1* | 1/2020 | Shah | H04S 7/302 |
| 2020/0043239 | A1* | 2/2020 | Lee | G06F 3/011 |
| 2020/0081114 | A1* | 3/2020 | Bialer | G01S 7/352 |
| 2020/0278432 | A1* | 9/2020 | Thorpe | G01C 3/08 |

OTHER PUBLICATIONS

Lin, Yu-Chien; Chung, Wei-Ho; Lee, Ta-Sung; and Pan, Yun-Han—"Non-Cooperative Interference Avoidance in Automotive OFDM Radars"; © 2019 IEEE (Year: 2019).*

Al-Qudsi Belal et al: "Zoom FFT for precise spectrum calculation in FMCW radar using FPGA", Proceedings of the 2013 9th Conference on Ph.D. Research in Microelectronics and Electronics (PRIME), IEEE, Jun. 24, 2013.

Transmittal of the International Search Report and Written Opinion of the International Searching Authority, filed Oct. 30, 2020, for International Application No. PCT/US2020/058283, dated Feb. 22, 2021, pp. 12.

* cited by examiner

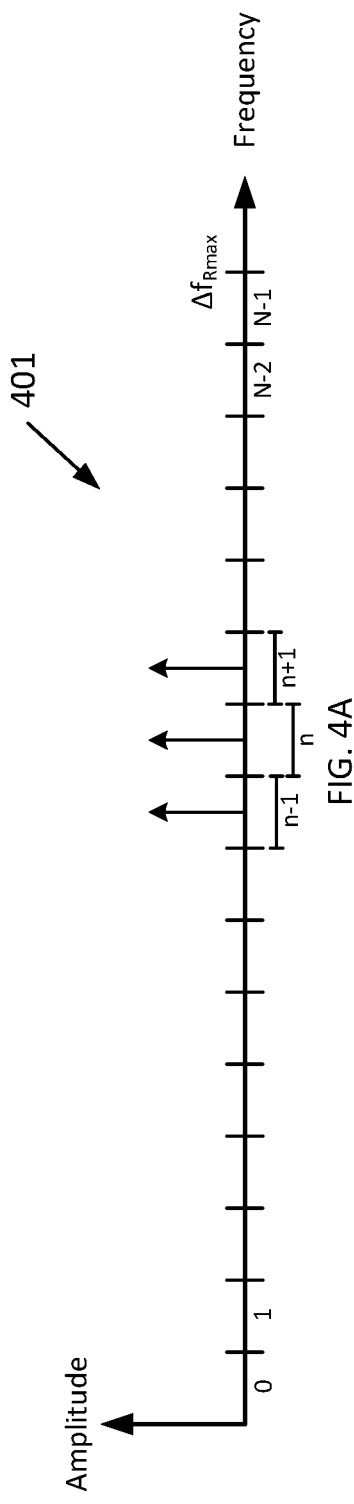
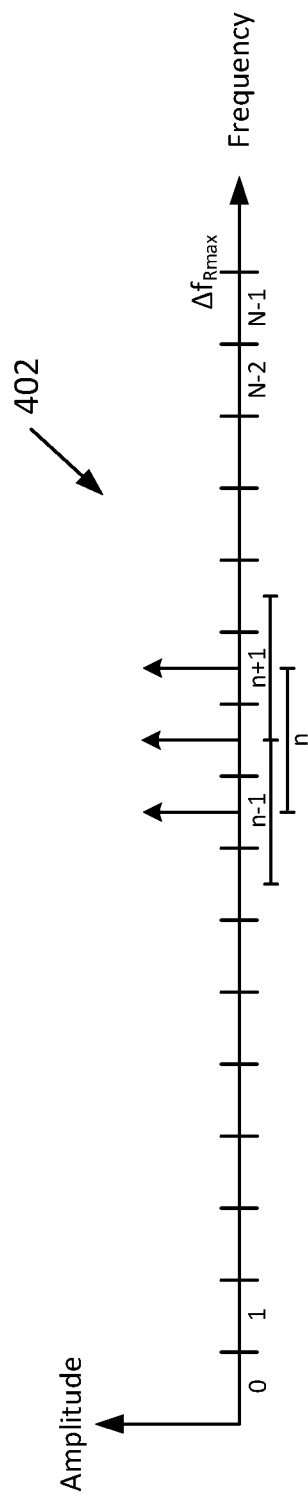
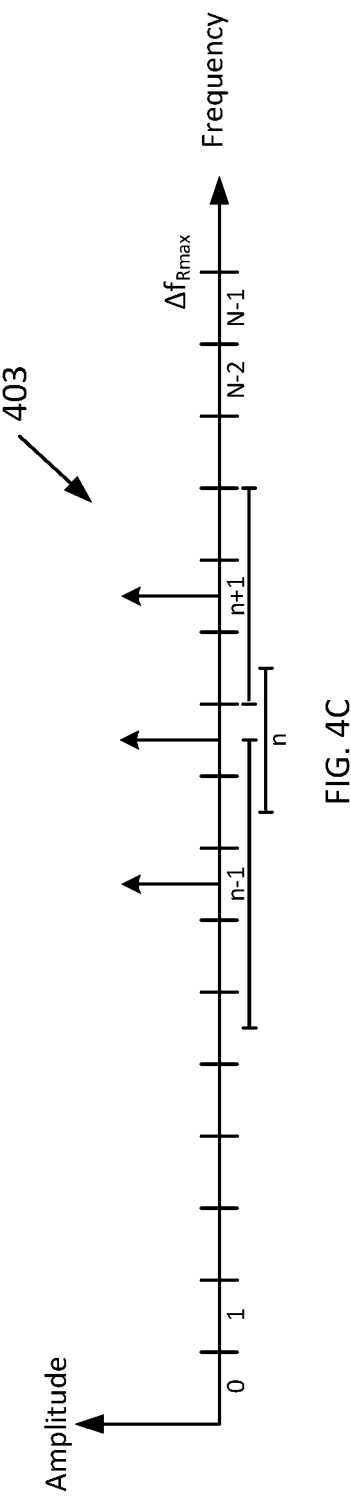
FIG. 4A
FIG. 4B
FIG. 4C

SELECTIVE SUBBAND PROCESSING FOR A LIDAR SYSTEM

FIELD

The present disclosure is related to light detection and ranging (LIDAR) systems in general, and more particularly to power savings in LIDAR systems by selective processing of frequency subbands in the time domain and frequency domain.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal. Mixing the local copy with the return signal, delayed by the round trip time to the target and back, generates a beat frequency at the receiver for each target.

There is a linear relationship between the beat frequency and the distance of a given target. The target distance can be determined by measuring the beat frequency. Typical digital signal processing architectures process the entire frequency band, covering all possible target distances in the detection range of the LIDAR system, even when there is no target to generate a return signal at some frequencies. This full-band processing results in high power consumption.

SUMMARY

The present disclosure describes various examples of LIDAR systems and methods for range measurement using selective subband detection and processing to reduce power consumption and chip area required for signal processing.

In one example, a system includes a time domain processing module configured to receive samples of a range-dependent time domain baseband signal in a frequency modulated continuous wave (FMCW) LIDAR system. The time domain processing module separates the baseband signal into frequency subbands in the time domain and selects a set of frequency subband signals based on subband selection criteria. The system also includes a time domain to frequency domain converter coupled with the time domain processing module, that is configured to convert the set of frequency subband signals in the time domain to a corresponding set of subband signals in the frequency domain.

In one example, the time domain processing module includes a time domain pre-processor configured to condition the samples of the range-dependent baseband signal, a subband generator, coupled to the time domain pre-processor, configured to generate a plurality of frequency subbands in the time domain, a subband selection engine, coupled to the subband generator, to select the set of frequency subband signals, based on the subband selection criteria; and a sample block generator, coupled to the subband generator and the subband selection engine, to resample and combine the selected subband signals into a combined time domain signal.

In one example, the system also includes a frequency domain subband processing module configured to receive subband signals in the frequency domain from the time domain to frequency domain converter, and to detect energy peaks or signal-to-noise ratio (SNR) peaks in the subband signals in the frequency domain corresponding to target ranges in the field of view of the LIDAR system.

In one example, the frequency domain processing module includes a frequency domain subband processor, coupled to the time domain to frequency domain converter, to condition the subband signals in the frequency domain, and a peak search engine, coupled to the frequency domain subband processor, configured to detect the energy peaks and the SNR peaks of the subband signals in the frequency domain.

In one example, the frequency domain processing module is configured to generate subbands and to select subband signals in the frequency domain based on subband selection criteria in the frequency domain.

In one example, the frequency domain processing module includes a subband generator, coupled to the time domain to frequency domain converter, to generate a plurality of subbands in the frequency domain, a frequency domain subband selection engine, coupled to the frequency domain subband generator, to select a set of subband signals from the plurality of subbands, based on the subband selection criteria, a frequency domain subband processor, coupled to the frequency domain subband generator and the frequency domain subband selection engine, configured to condition the selected subband signals, and a peak search engine, coupled to the frequency domain processor, configured to detect energy peaks and SNR peaks in the subband signals corresponding to target ranges in the field of view of the LIDAR system.

In one example, a method in an FMCW LIDAR system includes receiving, in a time domain processing module, samples of a range-dependent time domain baseband signal in a frequency modulated continuous wave (FMCW) LIDAR system, generating frequency subbands in the time domain, selecting a set of frequency subband signals in the time domain based on subband selection criteria, and converting, in a time domain to frequency domain converter coupled with the time domain processing module, the set of frequency subband signals in the time domain to a corresponding set of subband signals in the frequency domain.

In one example, the method also includes receiving, in a frequency domain subband processor, the set of subband signals in the frequency domain from the time domain to frequency domain converter, and searching, with a peak search engine, the set of subband signals in the frequency domain for energy peaks or signal-to-noise ratio peaks corresponding to target ranges in the field of view of the LIDAR system.

In one example, the method includes, in a frequency domain processing module coupled to the time domain to frequency domain converter, generating with a subband generator a plurality of subbands in the frequency domain, and selecting, with a subband selection engine, a set of subband signals from the plurality of subbands in the frequency domain, based on frequency domain subband selection criteria.

In one example, a non-transitory computer-readable medium includes instructions that, when executed by a processor in an FMCW LIDAR system, causes the system to perform operations including, receiving, in a time domain pre-processor, samples of a range-dependent time domain baseband signal in a frequency modulated continuous wave (FMCW) LIDAR system, generating, with a subband generator, a plurality of frequency subbands in the time domain from the samples of the range-dependent baseband signal, selecting, in a subband selection engine, a set of subband signals in the time domain, based on time domain subband selection criteria, and converting, in a discrete Fourier transform (DFT) engine, the set of the subband signals from the time domain to a corresponding set of signals in the frequency domain.

In one example, the operations also include searching the set of subbands in the frequency domain, with a peak search engine, for energy peaks or signal-to-noise ratio peaks, and assigning the energy peaks in rank order to targets in a field of view of the LIDAR system.

In one example, the operations also include receiving the set of signals from the DFT engine at a frequency domain subband generator, generating, with the subband generator, a plurality of subbands in the frequency domain, selecting, with a frequency domain subband selection engine, a set of subband signals in the frequency domain, based on frequency domain subband selection criteria, and searching, with a peak search engine, the set of subband signals for energy peaks or signal-to-noise ratio peaks corresponding to target ranges.

BRIEF DESCRIPTION OF THE DRAWINGS

For a more complete understanding of various examples, reference is now made to the following detailed description taken in connection with the accompanying drawings in which like identifiers correspond to like elements:

FIGS. 4A-4C are frequency-amplitude diagrams illustrating frequency content of subbands in the time domain according to the present disclosure;

DETAILED DESCRIPTION

The present disclosure describes examples of LIDAR systems and methods therein, for range measurement that selectively processes frequency subbands of target return signals, generated in the time domain and/or the frequency domain, to reduce power consumption and processing complexity.

Figure 1:
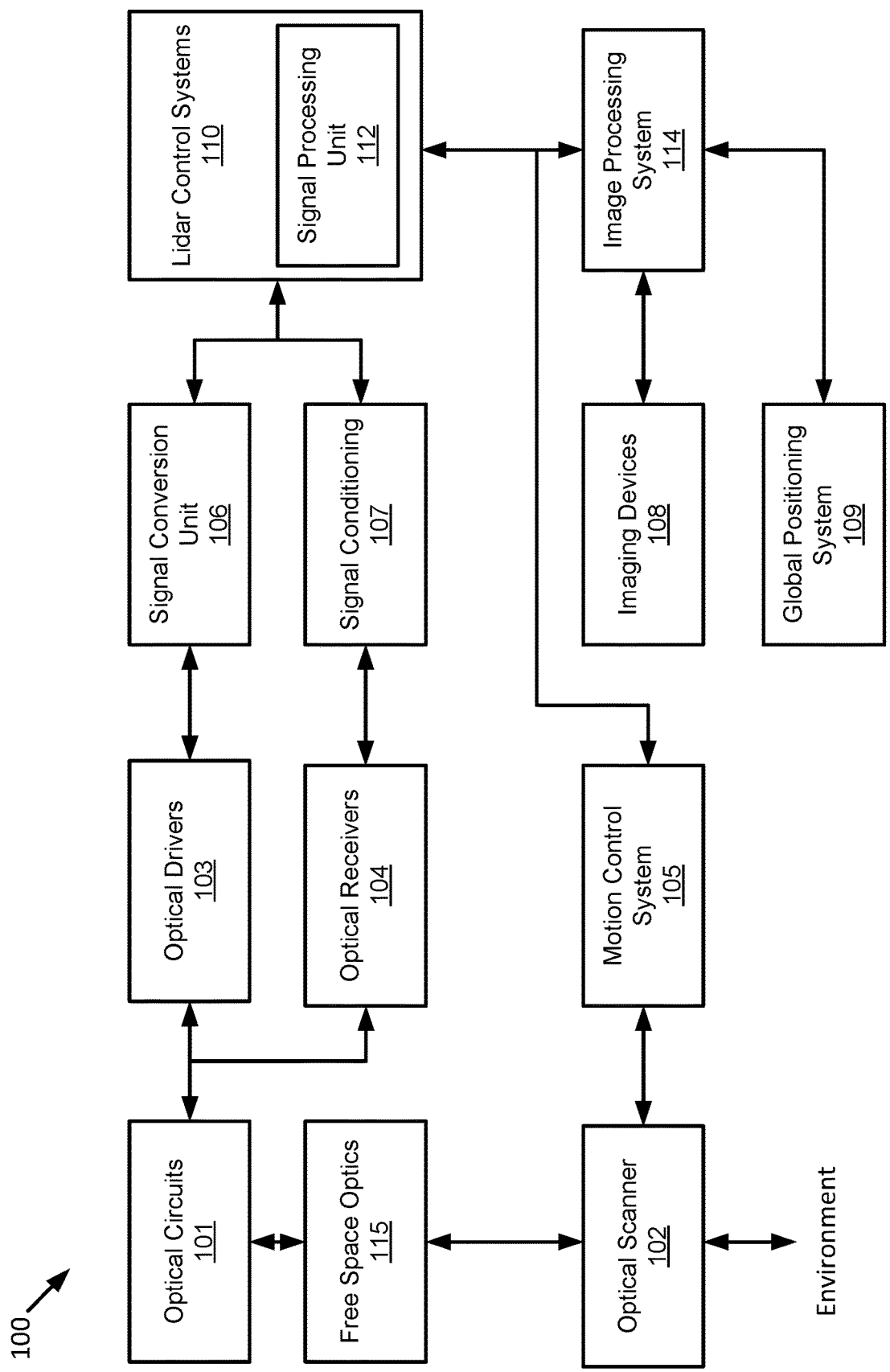
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101 implemented on a photonics chip. The optical circuits 101 may include a combination of active optical components and passive optical components. Active optical components may generate, amplify, or detect optical signals and the like. In some examples, the active optical circuit includes optical beams at different wavelengths, one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a digital signal processor. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control subsystem. The optical circuits may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
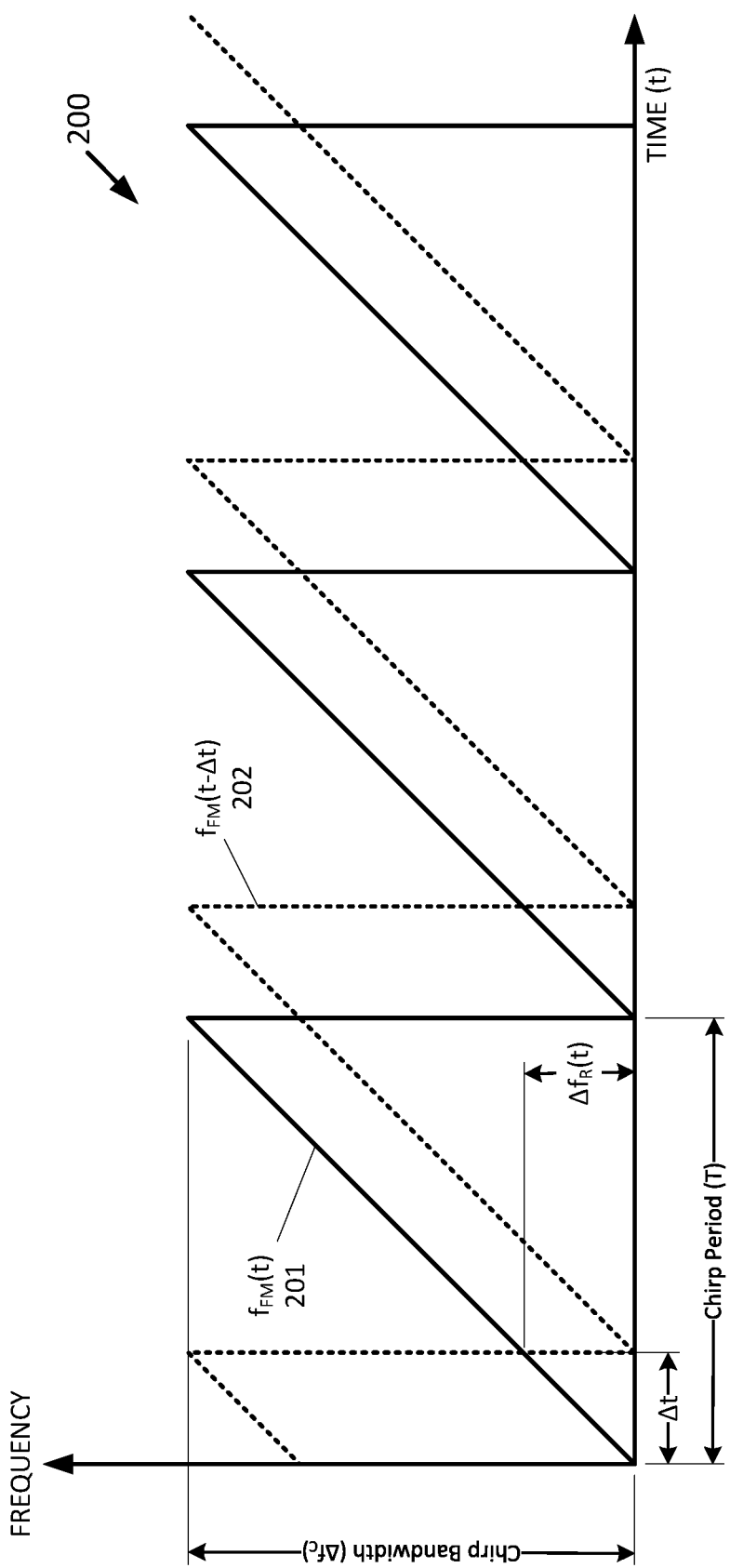
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment. In this example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$.

Also illustrated in FIG. 2 is an example of a target return signal 202. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in system. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR scanning system. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency, the so-called Nyquist limit. For example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system. For example, and without limitation, a time segment might correspond to a predetermined number of chirp periods T, or a number full rotations in azimuth by the optical scanner.

Figure 3:
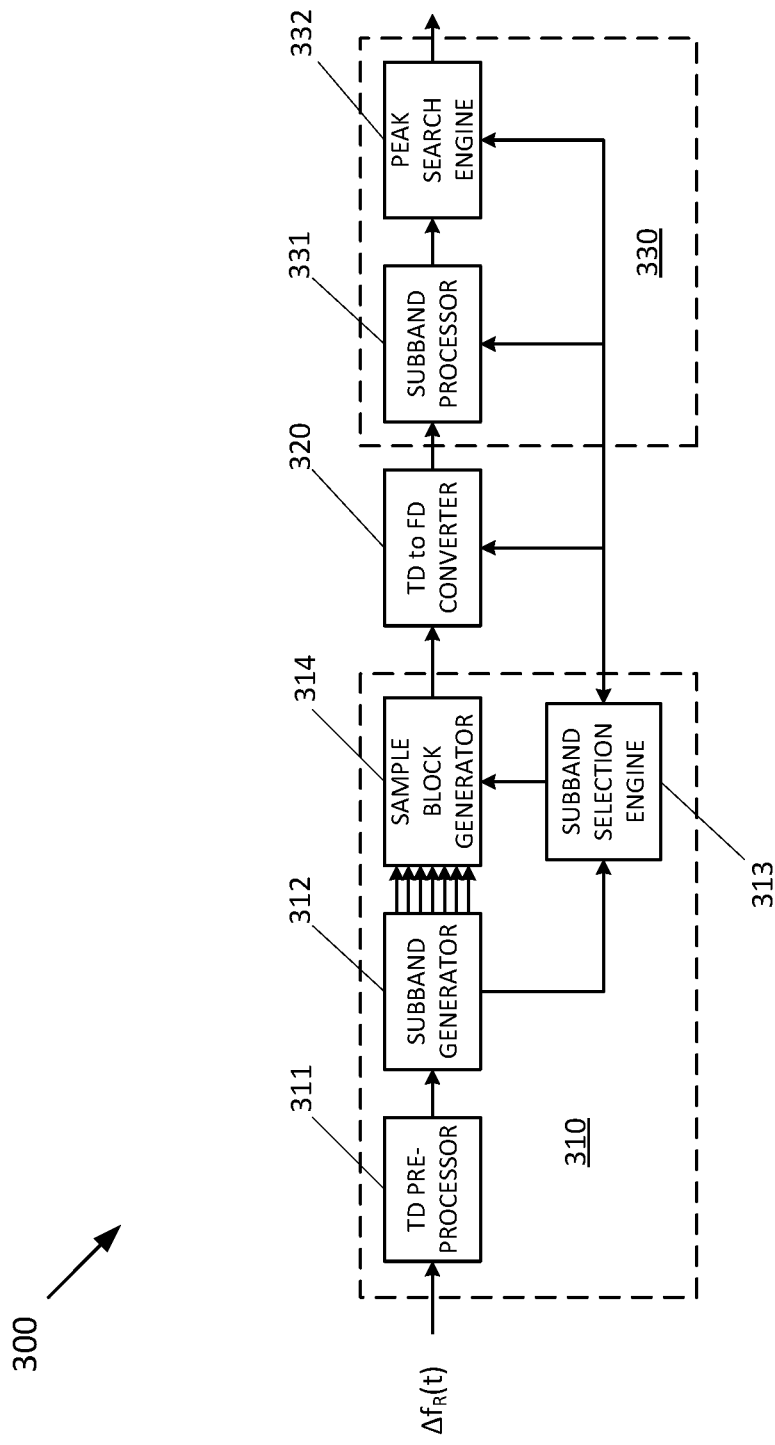
FIG. 3 is a block diagram illustrating an example signal processing system using subband selection in the time domain according to the present disclosure.

FIG. 3 is a block diagram of an example signal processing system 300 using time domain subband processing to determine target range. System 300 may be, for example, a subsystem or component of signal processing unit 112 of LIDAR system 100. System 300 may be implemented in hardware, firmware, software, or some combination of hardware, firmware and software.

In one example, system 300 includes a time domain processing module 310, a time domain to frequency domain converter 320, and a frequency domain processing module 330.

In one example, time domain processing module 310 is configured to receive a continuous stream of digitized samples of a range-dependent time domain baseband signal $\Delta f_R(t)$ in a frequency modulated continuous wave (FMCW) LIDAR system, such as system 100, to separate the baseband signal into frequency subbands in the time domain, and to select a set of subband signals in the time domain based on subband selection criteria. The time domain to frequency domain converter 320 is configured to convert the set of subband signals in the time domain to a corresponding set of subband signals in the frequency domain, and the frequency domain processing module 330 is configured to condition the range-dependent frequency domain outputs and to search the range-dependent frequency domain outputs for energy peaks corresponding to target ranges.

In one example, the time domain processing module 310 includes a time domain pre-processor 311 configured to condition the samples of the range-dependent baseband signal. Examples of signal conditioning include, without limitation, band limiting and shaping (e.g., Hamming or Hann windowing) the time domain samples to reduce noise and signal conversion artifacts in subsequent signal processing operations.

The pre-processed time domain samples are then provided to a time domain subband generator 312 that produces N frequency-limited time domain subbands (where N is an integer greater than 1) with up to N different center frequencies and N different bandwidths. The subbands may be overlapping or non-overlapping. The subbands cover the full spectrum of the beat frequency from 0 to $\Delta f_{Rmax}$, but not every subband may contain signal energy depending on the number and ranges of objects in the field of view of the LIDAR system. For example, in an otherwise empty parking lot with a few parked vehicles, only a few subbands will have signal energy corresponding to the ranges to those vehicles. This is illustrated in the examples of FIGS. 4A-4C, illustrating different ways of generating subbands, where the beat frequency signal energy is limited to three subbands.

For purposes of illustration only, and without limitation, it is assumed in FIGS. 4A-4C that N=16. FIG. 4A illustrates a spectrum 401 for the simplest case where the subbands have uniform bandwidth and are non-overlapping, and signal energy is limited to subbands n−1, n, and n+1 (where 0<n<N). FIG. 4B illustrates a spectrum 402 for the case of uniform bandwidths with uniform overlaps, which may be used to avoid the loss of performance at the edges of the subbands. FIG. 4C illustrates a spectrum 403 for a third case where the subbands have non-uniform bandwidths and non-uniform overlaps, which can reduce processing overhead compared to FIG. 4B.

Figure 5:
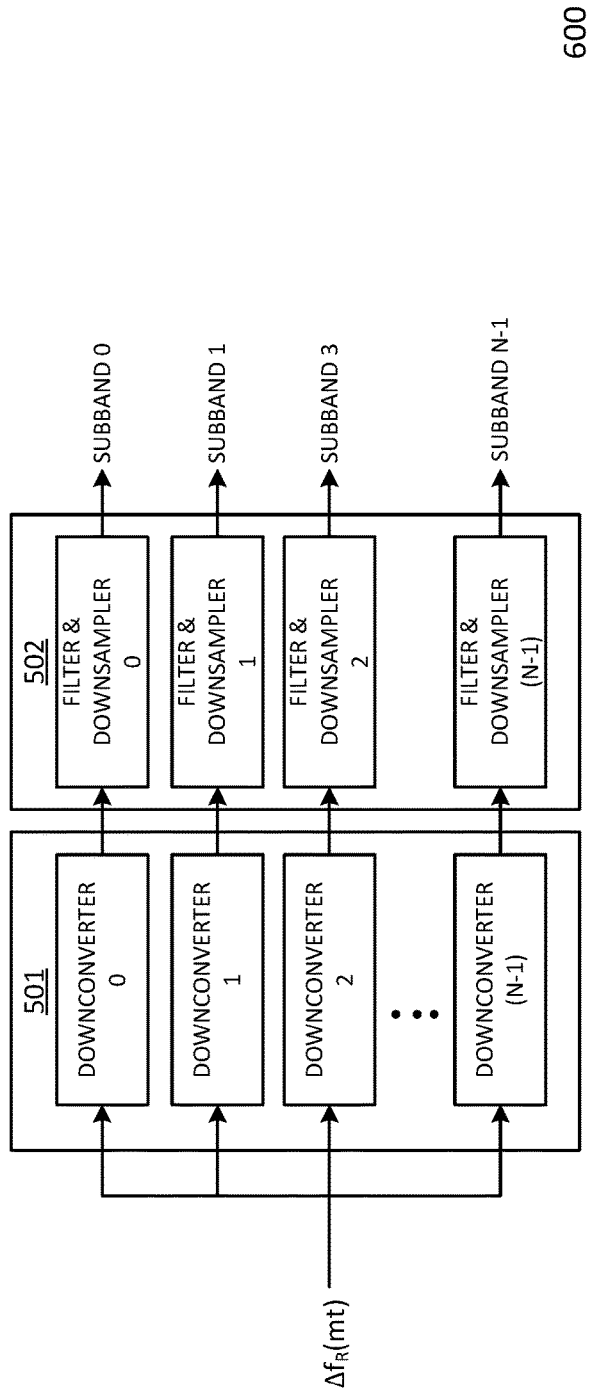
FIG. 5 is a block diagram illustrating an example of a subband generator in the time domain according to the present disclosure.

FIG. 5 is a block diagram of an example time domain subband generator 500 that can generate time domain subbands like those described above with respect to time domain subband generator 312. Subband generator 500 includes a bank 501 of N downconverters, 0 through (N−1), to convert the input signal $\Delta f_R(t)$ to N different center frequencies, corresponding to the N subbands of FIGS. 4A-4C. The downconverter signals are then bandlimited and downsampled by a bank 502 of N filter and downsamplers 0 through 502-(N−1) to generate N subbands 0 through N−1. Overlapping subbands may be created by adjusting the downconverter frequencies and filter bandwidths.

Figure 6:
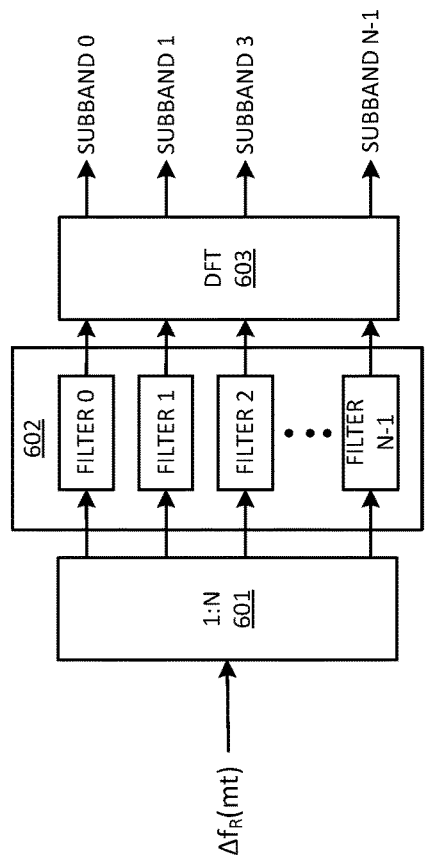
FIG. 6 is a block diagram illustrating another example of a subband generator in the time domain according to the present disclosure.

FIG. 6 is a block diagram of an example time domain subband generator 600 that can generate uniform, non-overlapping time domain subbands as described above with respect to time domain subband generator 312, but in a less complex way than subband generator 500.

Subband generator 600 includes a 1:N downsampler 601 that receives the sampled input signal $\Delta f_R(t)$ and distributes the input signal to filter bank 602, such that FILTER 0 receives samples 0, N, 2N, ..., FILTER 1 receives samples 1, N+1, 2N+1, ..., etc. The center frequencies of the filters in the filter bank 602 are uniformly spaced and have uniform bandwidth. The outputs of the filter bank 602 are fed to a discrete Fourier transform engine 603, which may perform a fast Fourier transform (FFT)

Returning to FIG. 3, in one example, time domain processing module 310 also includes a subband selection engine 313, coupled to the subband generator, to select a set of frequency subband signals, based on the subband selection criteria. As noted above, some subbands may have no signal energy based on the absence of targets at ranges corresponding to those subbands. These subbands will be automatically deselected, while subbands with signal energy will be selected against the aforementioned subband selection criteria.

In one example, the subband selection criteria in the time domain may include one or more of the total energy in a subband, the signal-to-noise ratio in the subband, the number of zero crossings, the number of clipped samples, energy variation over time, the azimuth angle of the scan, the elevation angle of the scan, the relative velocity (EGO velocity) of a detected target, scene characteristics, the detection of objects in a previous LIDAR time segment, and a maximum number of allowed subbands. Subbands that do not meet the subband selection criteria undergo no further processing.

Figure 11:
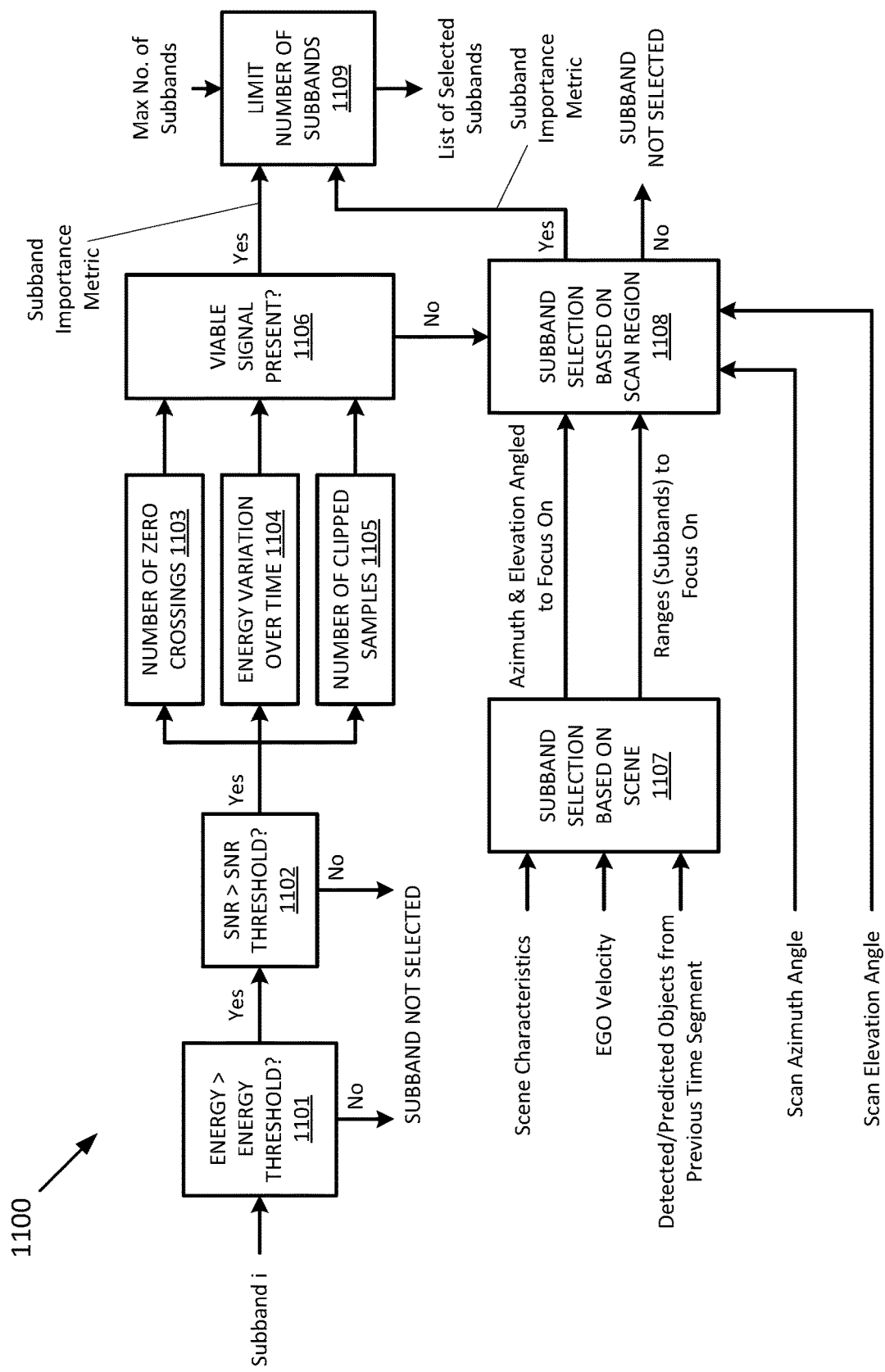
FIG. 11 is a flowchart illustrating an example method for selecting frequency subbands in the time domain according to the present disclosure.

FIG. 11 is a flowchart 1100 illustrating an example algorithm for selecting frequency subbands in the time domain, using the subband selection criteria described above, where labeled arrows indicate inputs or outputs and the labeled boxes represent decision points or tests based on the inputs.

For each subband i, the algorithm first asks at operation 1101 if the energy in the subband is greater than a predetermined threshold energy. If the answer is no, then the subband is not selected. If the answer is yes, then at operation 1102 the algorithm asks if the signal-to-noise (SNR) ratio of the subband is greater than a predetermined threshold. If the answer is no, the subband is not selected. If the answer is yes, then the subband is examined for the presence of various characteristics associated with a subband of interest including the number of zero crossings per time segment at 1103, the energy variation in the subband per time segment at 1104, and the number of clipped samples per time segment at 1105. The result of these assessments is a decision at 1106 whether the subband is of interest based on energy related selection criteria and assigned a subband importance metric.

The algorithm also takes into account other inputs such as scene characteristics, camera-based velocity data (EGO velocity), and objects already detected or predicted from preceding time intervals to determine which ranges, elevation angles and azimuth angles to prioritize. For example, a scene might be classified as a parking lot, a surface street or a freeway based on accumulated scan data or GPS assisted mapping and used to prioritize azimuth/elevation angles, EGO velocities and previously detected objects may be used to prioritized ranges (i.e., subbands) associated with those objects. These factors are evaluated at 1107 to determine the ranges, azimuth angles and elevation angles to focus on. These outputs are combined with current scan elevation and azimuth angles at 1108 to determine which scan regions to focus on. Examples of focus regions might be any combination of range (e.g., short, medium or long range) and field of view (e.g., narrow, medium and wide) depending on the scene parameters described above. So even if a subband is not selected based on energy criteria, it may be selected based on scene characteristics, and assigned a subband importance metric as illustrated in FIG. 11. These two sources of subband selection are combined at 1109 along with a limit on the maximum number of subbands, to produce a list of selected subbands.

In one example, frequency domain processing module 310 also includes a sample block generator 314, coupled to the subband generator 312 and the subband selection engine 313, to resample and combine the set of selected subband signals into a combined time domain signal containing the signals in the selected frequency subbands. In one example, the block lengths may correspond to the system "time segment" duration as described above. In other examples, the block lengths may be variable for each subband depending on the subband selection criteria satisfied by the selected subband.

The outputs of the sample block generator 314 are provided to the time domain to frequency domain converter 320. In one example, the time domain to frequency domain converter 320 may be a discrete Fourier transform engine and, in particular, a fast Fourier transform engine implementing the Cooley-Tukey algorithm. The outputs of the time domain to frequency domain converter 320 are a set of subband signals in the frequency domain corresponding to the frequency subbands selected in the time domain in time domain processing module 310.

In one example, the subbands in the frequency domain from the time domain to frequency domain converter 320 are provided to frequency domain processing module 330, which includes a frequency domain subband processor 331 and a peak search engine 332. The frequency domain subband processor 331 is configured to condition the frequency domain subbands for the peak search engine 332. Conditioning of the frequency domain subbands may include, for example, and without limitation, resampling and averaging the frequency domain subband signals for noise reduction. The peak search engine 332 is configured to detect energy peaks and signal-to-noise ratio peaks in the frequency domain subbands that can be correlated with target ranges.

Figure 7:
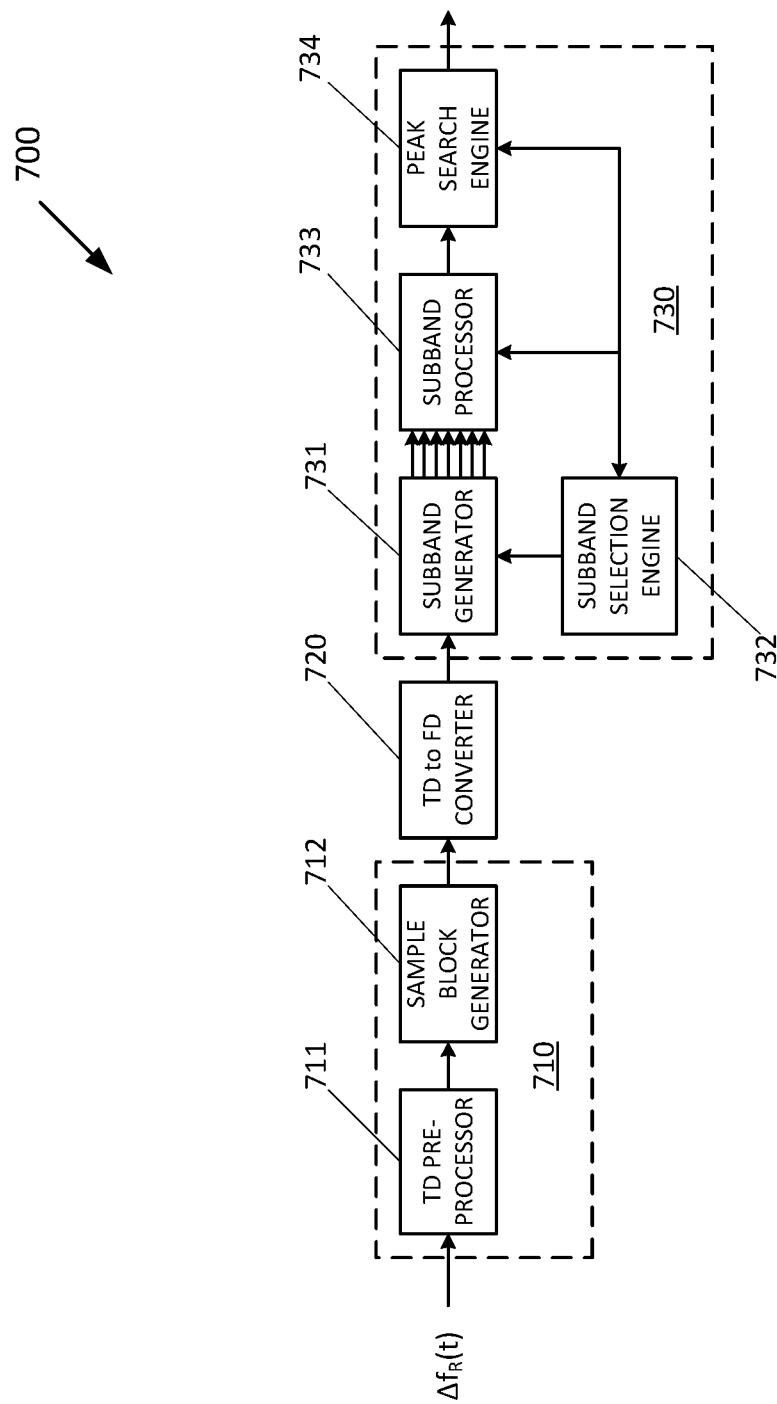
FIG. 7 is a block diagram illustrating an example signal processing system using subband selection in the frequency domain according to the present invention.

FIG. 7 is a block diagram of an example signal processing system 700 using frequency subband selection in the frequency domain to determine target ranges. System 700 includes a time domain processing module 710 to receive samples of a range-dependent baseband signal such as beat frequency signal $\Delta f_R(t)$ and to generate block samples of the baseband signal in a single frequency band including the full bandwidth of the range-dependent baseband signal. System 700 also includes a time domain to frequency domain converter 720 to convert the block samples into subbands of discrete frequencies corresponding to target ranges in the field of view of the LIDAR system. As previously noted, the time domain to frequency domain converter 720 may be implemented as a Discrete Fourier Transform (DFT). The length of the DFT will determine the number of discrete frequency bins at the output of the DFT (i.e., an n-point DFT will divide to output spectrum into n frequency bins). For example, a 1024 point DFT will generate an output with 1024 frequency bins. System 700 also includes a frequency domain processing module 730 to generate frequency domain subbands from the output of the time domain to frequency domain converter 720, select a subset of frequency domain subbands based on frequency domain subband selection criteria, and detect energy peaks in the selected subbands corresponding to target ranges in the field of view of the LIDAR system. If frequency domain processing module 730 is configured to process a number of subbands that is fewer than the number of frequency bins generated by the DFT in the example above, each subband will contain multiple frequency bins. For example, if the frequency domain processing module is configured to process 32 subbands, then a 1024 point DFT will generate 16 frequency bins per subband. System 700 may be, for example, a subsystem or component of signal processing unit 112 of LIDAR system 100. System 700 may be implemented in hardware, firmware, software, or some combination of hardware, firmware and software.

In one example, time domain processing module 710 includes a time domain pre-processor 711 and a block sampler 712. In this example, time domain preprocessor 711 is similar in all respects to time domain processor 311 in system 300, and sample block generator 712 is similar in all respects to sample block generator 312 in system 300, with the exception that sample block generator 712 samples full bandwidth time segments of the input signal rather than selected subbands. Similarly, time domain to frequency domain converter 720 in system 700 is similar in all respects to time domain to frequency domain converter 320 in system 300, except that it converts full bandwidth blocks of the input signal rather than selected subbands. Accordingly, these elements will not be described here in detail.

In one example, frequency domain processing module 730 includes a frequency domain subband generator 731 to separate the full bandwidth output of the time domain to frequency domain converter 720 into subbands in the frequency domain. For example, frequency domain subband generator 731 may contain N polyphase filters to generate N frequency domain subbands. Frequency domain processing module 730 may also contain a frequency domain selection engine 732, coupled to the frequency domain subband generator 731, to select a set of subband signals from the plurality of subbands, based on the subband selection criteria.

In one example, the frequency domain subband selection criteria may include one or more of the total energy in a frequency domain subband, the signal-to-noise ratio in the frequency domain subband, the peak energy-to-noise in any frequency bin of a subband, the azimuth angle of the return signal, the elevation angle of the return signal, the relative velocity of a detected target (EGO velocity); scene characteristics, the detection of objects in a previous LIDAR time segment; and a maximum number of allowed subbands.

Figure 12:
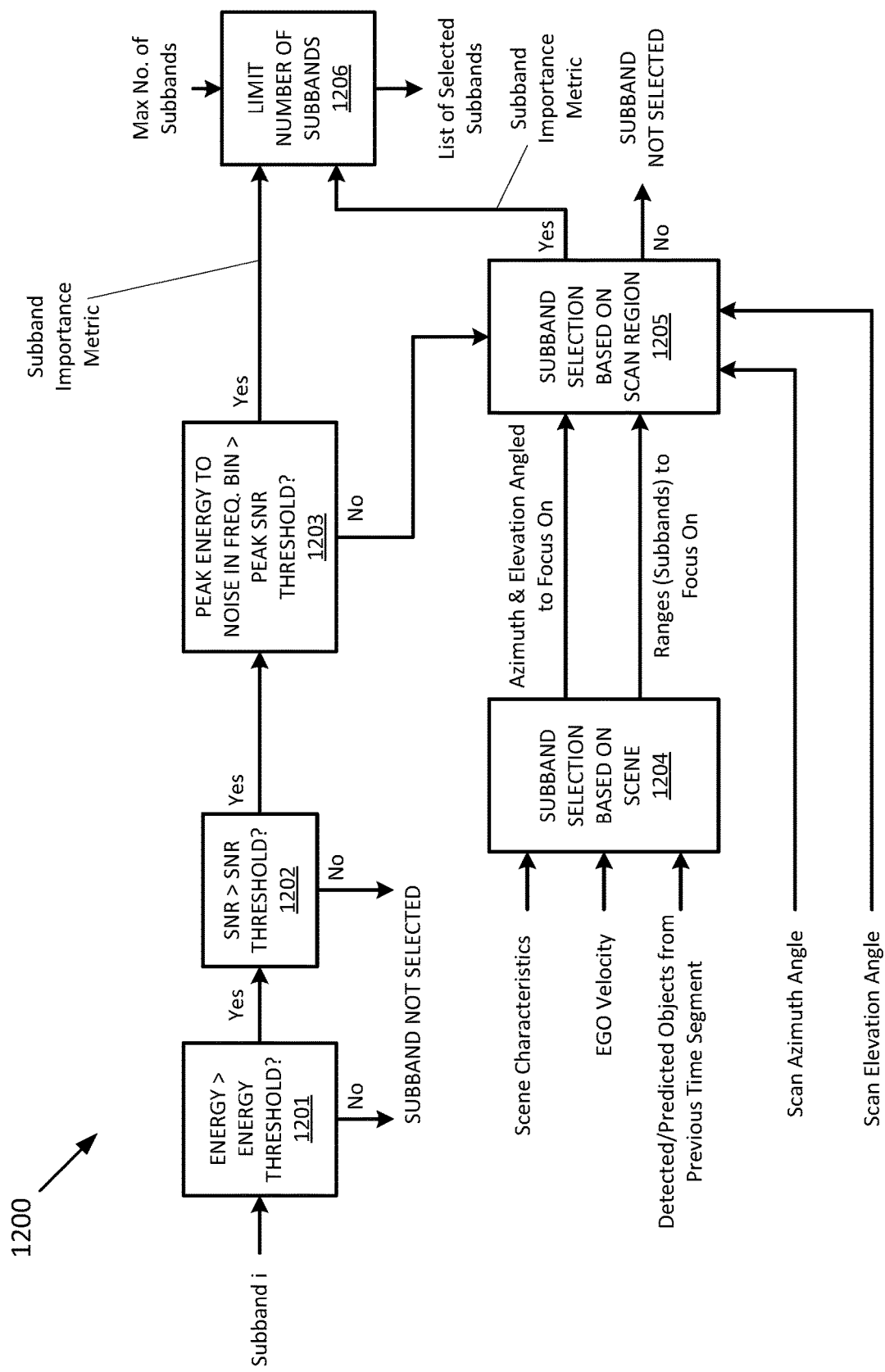
FIG. 12 is a flowchart illustrating an example method for selecting frequency subbands in the frequency domain according to the present disclosure.

FIG. 12 is a flowchart 1200 illustrating an example algorithm for selecting subbands in the frequency domain, using the subband selection criteria described above, where labeled arrows indicate inputs or outputs and the labeled boxes represent decision points or tests based on the inputs.

For each subband i, the algorithm first asks at operation 1201 if the energy in the subband is greater than a predetermined threshold energy. If the answer is no, then the subband is not selected. If the answer is yes, then at operation 1202 the algorithm asks if the signal-to-noise (SNR) ratio of the subband is greater than a predetermined threshold. If the answer is no, the subband is not selected. If the answer is yes, then at operation 1203 the algorithm asks if the peak energy-to-noise ratio in any frequency bin in the subband exceeds a predetermined SNR threshold. If the answer is no, the subband is not selected. If the answer is yes, then the algorithm assigns a subband importance metric to the subband based on the energy related selection criteria.

As described above with respect to subband selection in the time domain, the algorithm also takes into account other inputs such as scene characteristics, camera-based velocity data (EGO velocity), and objects already detected or predicted from preceding time intervals to determine which ranges, elevation angles and azimuth angles to prioritize. These factors were previously described in detail with respect to time domain processing, and will not be repeated here. These factors are evaluated at operation 1204 to determine the ranges, azimuth angles and elevation angles to focus on. These outputs are combined with current scan elevation and azimuth angles at 1205 to determine which scan regions to focus on. Examples of focus regions might be any combination of range (e.g., short, medium or long range) and field of view (e.g., narrow, medium and wide) depending on the scene parameters as described above. So even if a subband is not selected based on energy criteria, it may be selected based on scene characteristics, and assigned a subband importance metric as illustrated in FIG. 12. These two sources of subband selection are combined at 1206 along with a limit on the maximum number of subbands, to produce a list of selected subbands.

In one example, frequency domain processing module 730 also includes a frequency domain subband processor 733, coupled to the frequency domain subband generator 731 and the frequency domain subband selection engine 732, configured to condition the selected subband signals, and a peak search engine 734, coupled to the frequency domain subband processor 733, configured to detect energy peaks and SNR peaks in the subband signals corresponding to target ranges in the field of view of the LIDAR system. Frequency domain subband processor 733 is similar in all respects to frequency domain subband processor 331 in system 300, and peak search engine 734 is similar in all respects to peak search engine 332 in system 300. Accordingly, these components will not be described here in detail.

Figure 8:
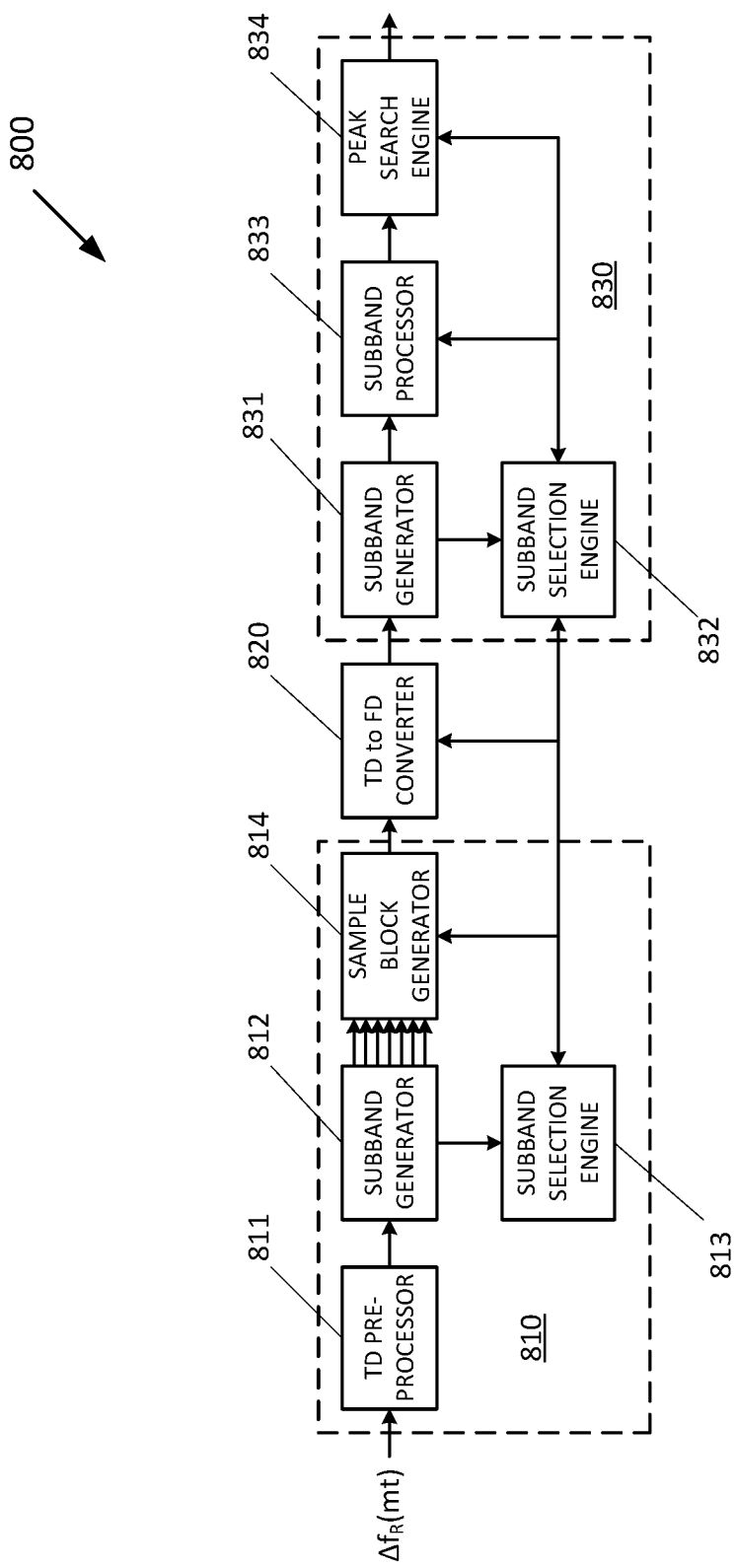
FIG. 8 is a block diagram illustrating an example signal processing system using subband selection in the time domain and subband selection in the frequency domain according to the present disclosure.

FIG. 8 is a block diagram of an example signal processing system 800 using both subband selection in the time domain and subband selection in the frequency domain to determine target ranges. System 800 includes a time domain processing module 810, a time domain to frequency domain converter 820, and a frequency domain processing module 830. System 800 may be, for example, a subsystem or component of signal processing unit 112 of LIDAR system 100. System 800 may be implemented in hardware, firmware, software, or some combination of hardware, firmware and software.

Time domain processing module 810 in system 800 is similar to time domain processing module 310 in all respects. Time domain processing module 810 includes a time domain pre-processor 811 similar to time domain pre-processor 311 in system 300, a subband generator 812 similar to subband generator 312 in system 300, a subband selection engine 813 similar to subband selection engine 313 in system 300, and a sample block generator 814 similar to sample block generator 314 in system 300. Accordingly, the details of time domain processing module 810 will not be described here in detail.

Similarly, the time domain to frequency domain converter 820 in system 800 is similar in all respects to time domain to frequency domain converter 320 in system 300. Accordingly, the details of time domain processing module 820 will not be described here in detail.

Additionally, the frequency domain processing module 830 is similar in all respects to the frequency domain processing module 730 in system 700. Frequency domain processing module 830 includes a subband generator 831 similar to subband generator 731 in system 700, a subband selection engine 832 similar to subband selection engine 732 in system 700, a subband processor 833 similar to subband processor 733 in system 700, and a peak search engine 834 similar to peak search engine 734 in system 700. Accordingly, the details of time domain processing module 830 will not be described here in detail.

Figure 9:
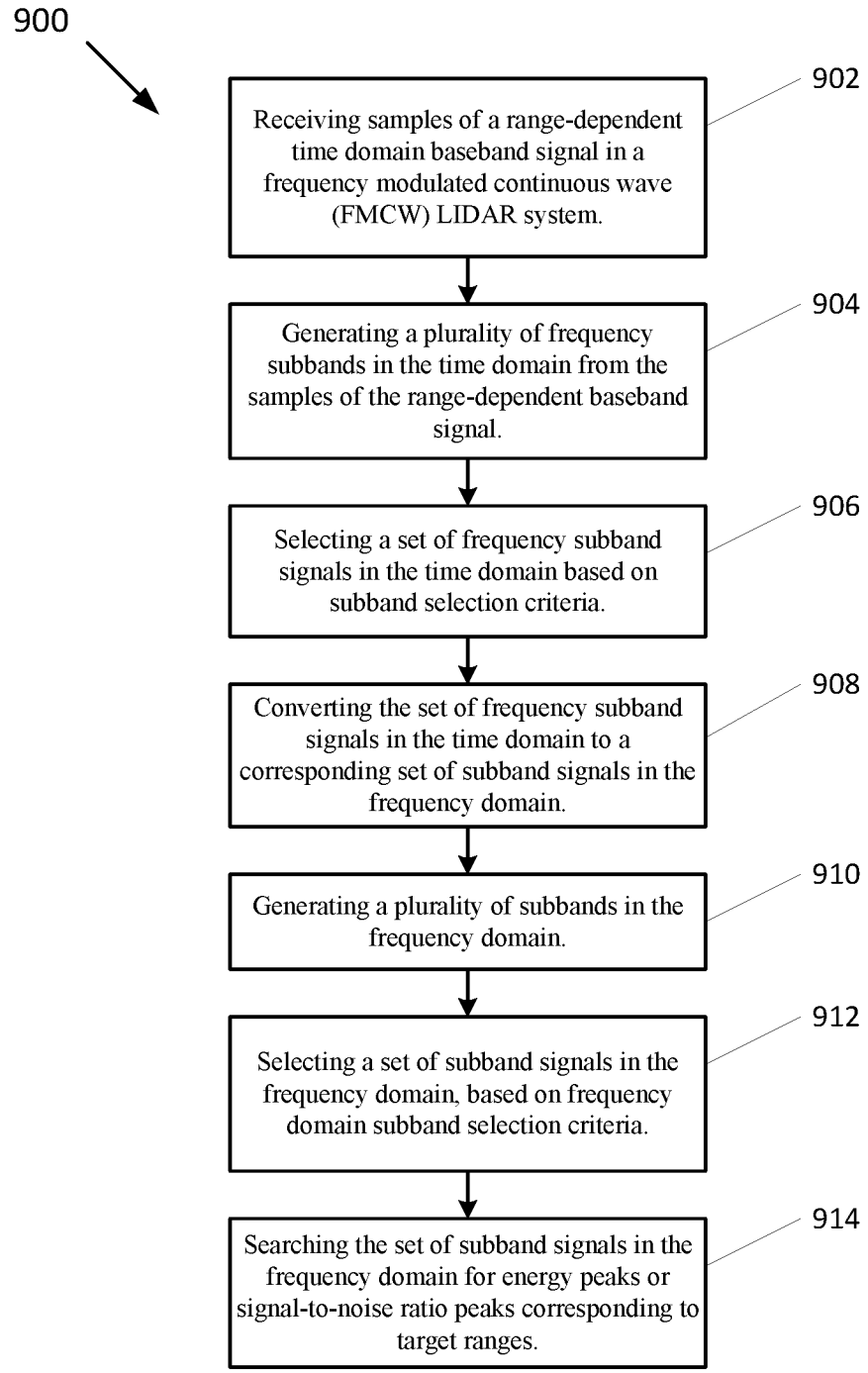
FIG. 9 is a flowchart illustrating an example method in a LIDAR system according to the present disclosure.

FIG. 9 is a flowchart illustrating an example method 900 in a LIDAR system according to the present disclosure. With reference to FIG. 8, the method 900 begins at operation 902, receiving samples of a range-dependent time domain baseband signal (such as signal $\Delta f_R(t)$ at time domain pre-processor 811). The method continues at operation 904, generating a plurality of frequency subbands in the time domain from the samples of the range-dependent baseband signal (e.g., with time domain subband generator 812 in system 800). The method continues at operation 906, selecting a set of frequency subband signals in the time domain based on subband selection criteria (e.g., with time domain subband selection engine 813 in system 800). Then, operation 908 converts the set of frequency subband signals in the time domain to a corresponding set of subband signals in the frequency domain. (e.g., with time domain to frequency domain converter 820). The next operation is 910, generating a plurality of time-limited frequency domain subbands (e.g., with frequency domain subband generator 831 in system 800). The method continues at operation 912, selecting a set of subband signals from the plurality of subbands in the frequency domain, based on frequency domain subband selection criteria (e.g., with frequency domain subband selection engine 832). The method concludes with operation 914, searching the set of time-limited frequency domain subbands for energy peaks corresponding to target ranges.

Figure 10:
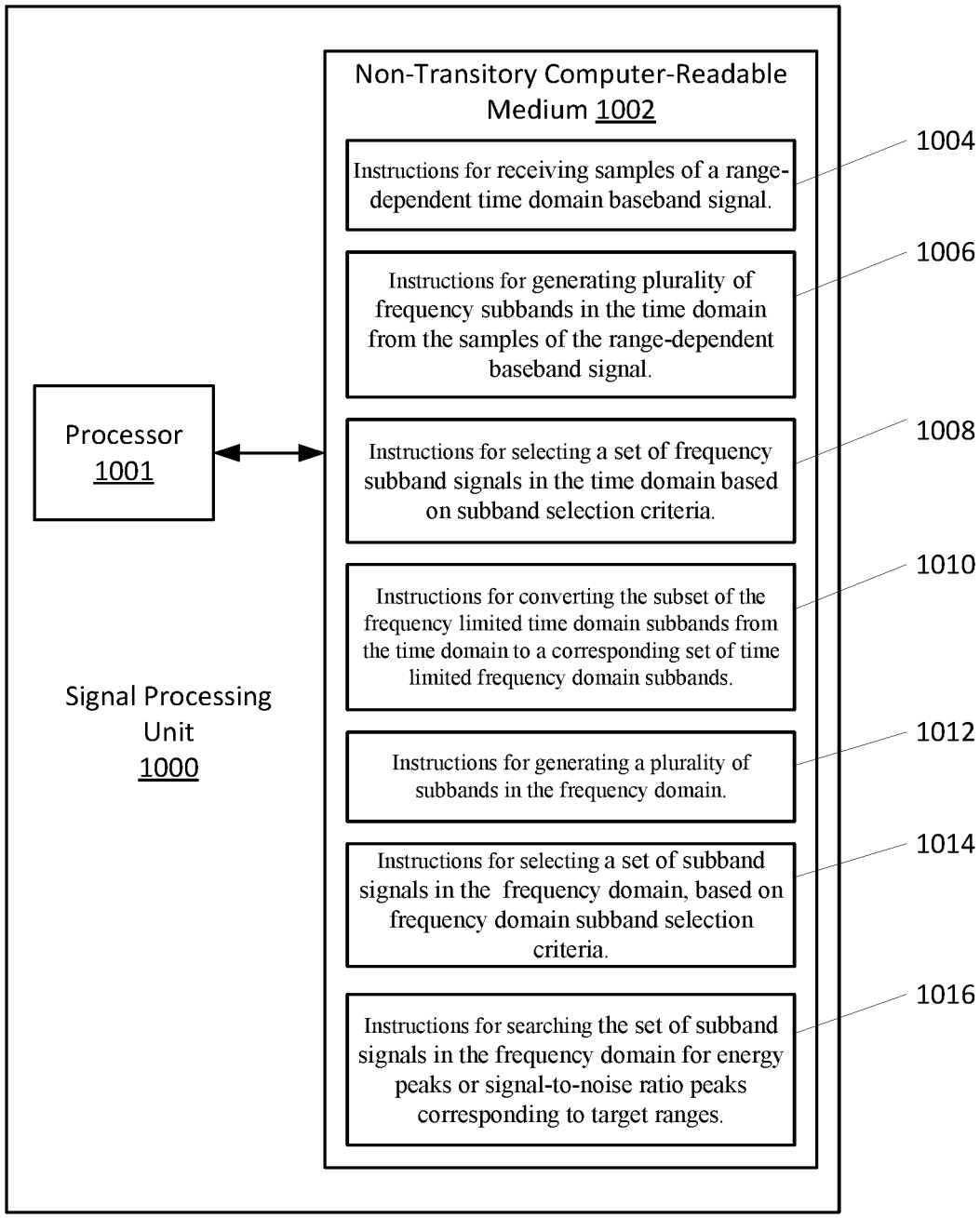
FIG. 10 is a block diagram illustrating a LIDAR system according to the present disclosure.

FIG. 10 is a block diagram of a signal processing system 1000 using time domain subband selection and frequency domain subband selection according to the present disclosure. System 1000 may be, for example, a subsystem or component of signal processing unit 112 of LIDAR system 100. System 1000 includes a processor 1001 coupled with a non-transitory computer-readable medium (CRM) 1002. CRM 1002 includes instructions that, when executed by processor 1002, causes the system 1000 to perform operations comprising the method 900. In particular, the non-transitory CRM 1002 includes instructions 1004 for receiving samples of a range-dependent time domain baseband signal, instructions 1006 for generating plurality of frequency subbands in the time domain from the samples of the range-dependent baseband signal, instructions 1008 for selecting a set of frequency subband signals in the time domain based on subband selection criteria, instructions 1010 for converting the subset of the frequency limited time domain subbands from the time domain to a corresponding set of time limited frequency domain subbands, instructions 1012 for generating a plurality of subbands in the frequency domain, instructions 1014 for selecting a set of subband signals in the frequency domain, based on frequency domain subband selection criteria, and instructions 1016 for searching the set of subband signals in the frequency domain for energy peaks or signal-to-noise ratio peaks corresponding to target range.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous wave (FMCW) LIDAR system, comprising:
   a memory; and
   a processor, operatively coupled to the memory, to:
      receive samples of a time domain baseband signal comprising range-dependent difference frequencies in the FMCW LIDAR system;
      generate a plurality of frequency subbands in a time domain;
      select a first set of subband signals from the plurality of frequency subbands, the first set of subband signals having energy values that exceed an energy threshold;
      select a second set of subband signals from the first set of subband signals, the second set of subband signals having signal-to-noise ratio (SNR) values that exceed an SNR threshold;
      convert the second set of subband signals in the time domain to a third set of subband signals in a frequency domain, wherein the third set of subband signals is resampled and combined; and
      detect energy peaks and SNR peaks in the third set of subband signals to target ranges in a field of view of the FMCW LIDAR system.

2. The FMCW LIDAR system of claim 1, wherein the processor is further to:
   condition the samples of the range-dependent baseband signal;
   and resample and combine the set of selected subband signals into a combined time domain signal.

3. The FMCW LIDAR system of claim 1, further comprising:

a 1:N down-sampler, where N is an integer greater than 1;

a bank of N digital filters coupled to the down-sampler; and a discrete Fourier transform (DFT) engine, coupled to the bank of digital filters, to generate N subbands in the time domain.

4. The FMCW LIDAR system of claim 1, wherein a subset of the second set of subband signals is selected based on at least one of number of zero crossings; number of clipped samples; energy variation over time; scan azimuth angle; scan elevation angle; ego velocity of a detected target; scene characteristics; detection of objects in a previous LIDAR time segment; or a maximum number of allowed subbands.

5. The FMCW LIDAR system of claim 1, wherein the processor is further to receive the combined time domain signal, and to generate subband signals in the frequency domain.

6. The FMCW LIDAR system of claim 1, wherein the processor is further:
to condition the subband signals in the frequency domain; and
detect the energy peaks and the SNR peaks of the subband signals in the frequency domain.

7. A method, comprising:
receiving samples of a time domain baseband signal comprising range-dependent difference frequencies in a frequency modulated continuous wave (FMCW) LIDAR system;
generating a plurality of frequency subbands in the time domain;
selecting, by a processor of the FMCW LIDAR system, a first set of frequency subband signals from the plurality of frequency subbands, the first set of subband signals having energy values that exceed an energy threshold;
selecting a second set of subband signals from the first set of subband signals, the second set of subband signals having signal-to-noise ratio (SNR) values that exceed an SNR threshold;
converting the second set of subband signals in the time domain to a third set of subband signals in a frequency domain, and
detecting energy peaks and SNR peaks in the third set of subband signals to target images in a field of view of the FMCW LIDAR system.

8. The method of claim 7, wherein generating a plurality of frequency subbands further comprises using a discrete Fourier transform (DFT) engine to generate the plurality of frequency subbands.

9. The method of claim 7, wherein selecting a second set of subband signals further comprises selecting a subset of the second set of subband signals based on at least one of peak energy-to-noise ratio in the subband; azimuth angle of a return signal; elevation angle of the return signal; ego velocity of a detected target; scene characteristics; detection of objects in a previous LIDAR time segment; or a maximum number of allowed subbands.

10. The method of claim 7, wherein generating the plurality of frequency subbands in the time domain comprises:
downsampling the sampled range-dependent baseband signal with a 1:N down-sampler, where N is an integer greater than 1;
filtering the downsampled signals with a bank of N digital filters; and
generating N subbands in the time domain.

11. A non-transitory computer-readable medium (CRM), with instructions therein that, when executed by a processor in a frequency modulated continuous wave (FMCW) LIDAR system, cause the processor to perform operations, comprising:
receiving samples of a time domain baseband signal comprising range-dependent difference frequencies in the FMCW LIDAR system;
generating a plurality of frequency subbands in the time domain from the samples of the range-dependent baseband signal;
selecting a first set of subband signals from the plurality of frequency subbands, the first set of subband signals having energy values that exceed an energy threshold;
selecting a second set of subband signals from the first set of subband signals, the second set of subband signals having signal-to-noise ratio (SNR) values that exceed an SNR threshold;
converting the second set of the subband signals from the time domain to a third set of subband signals in a frequency domain; and
detecting energy peaks and SNR peaks in the third set of subband signals to target ranges in a field of view of the FMCW LIDAR system.

12. The non-transitory CRM of claim 11, further comprising:
searching the third set of subband signals in the frequency domain for energy peaks or signal-to-noise ratio peaks; and
assigning the energy peaks in rank order to targets in the field of view of the FMCW LIDAR system.

13. The non-transitory CRM of claim 11, wherein selecting a second set of subband signals further comprises selecting a subset of the second set of subband signals based on at least one of peak energy-to-noise ratio in the subband; azimuth angle of a return signal; elevation angle of the return signal; ego velocity of a detected target; scene characteristics; detection of objects in a previous LIDAR time segment; or a maximum number of allowed subbands.

14. The non-transitory CRM of claim 11, wherein generating the plurality of frequency subbands in the time domain comprises:
downsampling the sampled range-dependent baseband signal with a 1:N down-sampler, where N is an integer greater than 1;
filtering the downsampled signals with a bank of N digital filters; and
generating N subbands in the time domain.

* * * * *